(12) United States Patent
Kuo

(10) Patent No.: US 8,121,409 B2
(45) Date of Patent: Feb. 21, 2012

(54) METHOD FOR HANDLING STATIC TEXT AND LOGOS IN STABILIZED IMAGES

(75) Inventor: Chia-Chen Kuo, Taichiung (TW)

(73) Assignee: CyberLink Corp., Xindian Dist., New Taipei (TW)

( * ) Notice: Subject to any disclaimer, the term of this patent is extended or adjusted under 35 U.S.C. 154(b) by 1031 days.

(21) Appl. No.: 12/037,096

(22) Filed: Feb. 26, 2008

(65) Prior Publication Data

US 2009/0214078 A1    Aug. 27, 2009

(51) Int. Cl.
*G06K 9/34* (2006.01)

(52) U.S. Cl. ........ 382/176; 382/177; 382/178; 382/171; 382/294; 382/264; 382/103; 382/105; 348/208.4; 348/208.99; 348/208.13; 348/239; 348/263; 348/267; 345/629

(58) Field of Classification Search .......... 382/176–178, 382/171, 264, 294, 107, 105, 103; 348/208.4, 348/208.99, 208.13, 239, 263, 267; 345/629
See application file for complete search history.

(56) References Cited

U.S. PATENT DOCUMENTS

| | | | | |
|---|---|---|---|---|
| 4,968,132 A * | 11/1990 | Ferren | ............................. | 352/46 |
| 5,566,251 A * | 10/1996 | Hanna et al. | ................... | 382/284 |
| 5,614,945 A * | 3/1997 | Sekine et al. | ............. | 348/207.99 |
| 5,732,146 A * | 3/1998 | Yamada et al. | ............... | 382/107 |
| 5,764,306 A * | 6/1998 | Steffano | ......................... | 348/586 |
| 5,832,101 A * | 11/1998 | Hwang et al. | .................. | 382/107 |
| 5,914,748 A * | 6/1999 | Parulski et al. | .............. | 348/239 |
| 5,940,139 A * | 8/1999 | Smoot | ............................ | 348/584 |
| 6,393,163 B1 * | 5/2002 | Burt et al. | ..................... | 382/294 |
| 6,404,936 B1 * | 6/2002 | Katayama et al. | ........... | 382/283 |
| 6,560,281 B1 * | 5/2003 | Black et al. | .................... | 375/240 |
| 6,707,940 B1 * | 3/2004 | Qian | ........................... | 382/173 |
| 6,937,766 B1 * | 8/2005 | Wilf et al. | ..................... | 382/229 |
| 6,983,081 B2 * | 1/2006 | Chen | ............................ | 382/284 |
| 6,999,103 B2 * | 2/2006 | Matsumoto et al. | .......... | 345/620 |
| 7,019,773 B1 * | 3/2006 | Heath | ........................ | 348/218.1 |
| 7,088,845 B2 * | 8/2006 | Gu et al. | ........................ | 382/103 |
| 7,209,181 B2 * | 4/2007 | Kriegman | ..................... | 348/586 |
| 7,221,395 B2 * | 5/2007 | Kinjo | ............................ | 348/239 |
| 7,222,300 B2 * | 5/2007 | Toyama et al. | ................ | 715/723 |
| 7,230,653 B1 * | 6/2007 | Overton et al. | ................ | 348/584 |
| 7,268,834 B2 * | 9/2007 | Lundberg et al. | ............. | 348/590 |
| 7,375,769 B2 * | 5/2008 | Yui | ................ | 348/584 |
| 7,456,904 B2 * | 11/2008 | Millar | .......................... | 348/589 |
| 7,474,698 B2 * | 1/2009 | Pan et al. | ................. | 375/240.08 |
| 7,535,497 B2 * | 5/2009 | Ouchi | .......................... | 348/239 |
| 7,646,434 B2 * | 1/2010 | Staker et al. | .................. | 348/592 |
| 7,649,571 B2 * | 1/2010 | Staker et al. | .................. | 348/592 |
| 7,656,131 B2 * | 2/2010 | Embrey et al. | ................ | 320/162 |
| 7,787,028 B2 * | 8/2010 | Kojo | ........................... | 348/239 |
| 7,956,929 B2 * | 6/2011 | Relan et al. | ................... | 348/576 |
| 8,000,498 B2 * | 8/2011 | Shih et al. | ..................... | 382/103 |
| 2003/0011715 A1 * | 1/2003 | Kastelic | ......................... | 348/589 |
| 2003/0090593 A1 * | 5/2003 | Xiong | .......................... | 348/620 |
| 2003/0174253 A1 * | 9/2003 | Ito et al. | ........................ | 348/699 |
| 2004/0017389 A1 * | 1/2004 | Pan et al. | ...................... | 345/723 |
| 2004/0098754 A1 * | 5/2004 | Vella et al. | ................... | 725/135 |

(Continued)

*Primary Examiner* — Jayesh A Patel

(74) *Attorney, Agent, or Firm* — Winston Hsu; Scott Margo

(57) ABSTRACT

To handle static text and logos in stabilized images without destabilizing the static text and logos, a method of handling overlay subpictures in stabilized images includes detecting an overlay subpicture in an input image, separating the overlay subpicture from the input image, stabilizing the input image to form a stabilized image, and merging the overlay subpicture with the stabilized image to obtain an output image.

5 Claims, 6 Drawing Sheets

U.S. PATENT DOCUMENTS

| | | | |
|---|---|---|---|
| 2004/0201753 A1* | 10/2004 | Kondo et al. | 348/239 |
| 2005/0238218 A1* | 10/2005 | Nakamura | 382/128 |
| 2006/0083304 A1* | 4/2006 | Pan et al. | 375/240.08 |
| 2008/0085766 A1* | 4/2008 | Sitrick | 463/31 |
| 2008/0253685 A1* | 10/2008 | Kuranov et al. | 382/284 |
| 2009/0060373 A1* | 3/2009 | Perera et al. | 382/264 |

* cited by examiner

METHOD FOR HANDLING STATIC TEXT AND LOGOS IN STABILIZED IMAGES

BACKGROUND OF THE INVENTION

1. Field of the Invention

The present invention relates to video enhancement, and more particularly, to a method for handling overlay subpictures in stabilized images.

2. Description of the Prior Art

Image stabilization is a technique used for preventing or eliminating instability in photographic devices, such as telescopes, binoculars, cameras, and video cameras. For devices such as telescopes, which are for observing the subjects in the distance, even a slight shake can cause a major shift in the image displayed. Likewise, for cameras employing long shutter speeds, stillness is necessary for ensuring capture of a clear, focused image with no blur. Thus, image stabilization is a powerful and important tool for helping observers, photographers, and videographers capture steady images without blur.

In the realm of video, image stabilization, which is typically a preventative technique employed at the photographic device, can also be employed as an editing "cure" for instability occurring from frame to frame in an existing video clip. Please refer to FIGS. 1 and 2, which illustrate an example of performing image stabilization according to the prior art. FIG. 1 shows a first frame 101 and a second frame 102 in sequence in a video clip 100. The first frame 101 precedes the second frame 102, and can be considered an image. From the first frame 101 to the second frame 102, observations about certain elements common to a scene being captured in the first frame 101 and the second frame 102 can be made. In the scene, a man 103 is photographed. It can be seen that the man 103 shifts downward from the first frame 101 to the second frame 102. Thus, the photographer either shifted or tilted the camera upward between the first frame 101 and the second frame 102. To stabilize the scene between the first frame 101 and the second frame 102, editing software can be utilized to crop a top portion of the scene displayed in the second frame 102, and fill in a bottom portion 110 of the scene displayed in the second frame 102, so as to maintain a constant resolution throughout the video clip 100. The filling in can be accomplished by utilizing an algorithm to extrapolate from existing data in the second frame 102, or previous data from earlier frames, such as the first frame 101, could also be utilized to fill in the bottom portion 110 of the scene displayed in the second frame 102. At this point, the image is considered stabilized.

In many situations, however, before stabilizing the image, it is likely that the image will have added text or logos, e.g. subtitles or a company logo. This may occur, for example, if the user received the image from another user who has already performed some editing, such as adding the logo or subtitles, or it could occur if the user previously added the subtitles themselves, and decides to perform image stabilization at a later point in the editing process. Please refer to FIG. 3, which illustrates image stabilization with subtitles according to the prior art. A video clip 300 includes a first frame 301 and a second frame 302, which can be considered an image. The image includes a mountain 303, subtitles 304, and a time display 305. Similar to the situation described above for FIGS. 1 and 2, when the editing software is utilized to perform image stabilization on the second frame 302, the second frame 302 is cropped at the top of the scene, and the algorithm is utilized to fill the in the bottom of the scene. However, this time, the subtitles 304 and the time display 305 are shifted up with the rest of the scene, as they are considered part of the scene. This means that as image stabilization is performed over the entirety of the video clip 300, the subtitles 304 and the time display 305 will jump up and down, or left and right, from frame to frame in the video clip 300. This disorients the viewer, rendering the subtitles 304 and the time display 305, and possibly the entire video clip 300, unviewable. Further, this destabilization could be extended to other desirably static items, such as logos and other added effects.

SUMMARY OF THE INVENTION

It is therefore an object of the present invention to provide a method for handling static text and logos in stabilized images which does not destabilize the static text and logos.

According to the preferred embodiment of the present invention, a method for handling overlay subpictures in stabilized images comprises detecting an overlay subpicture in an input image, stabilizing the input image to form a stabilized image, and merging the overlay subpicture with the stabilized image to obtain an output image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
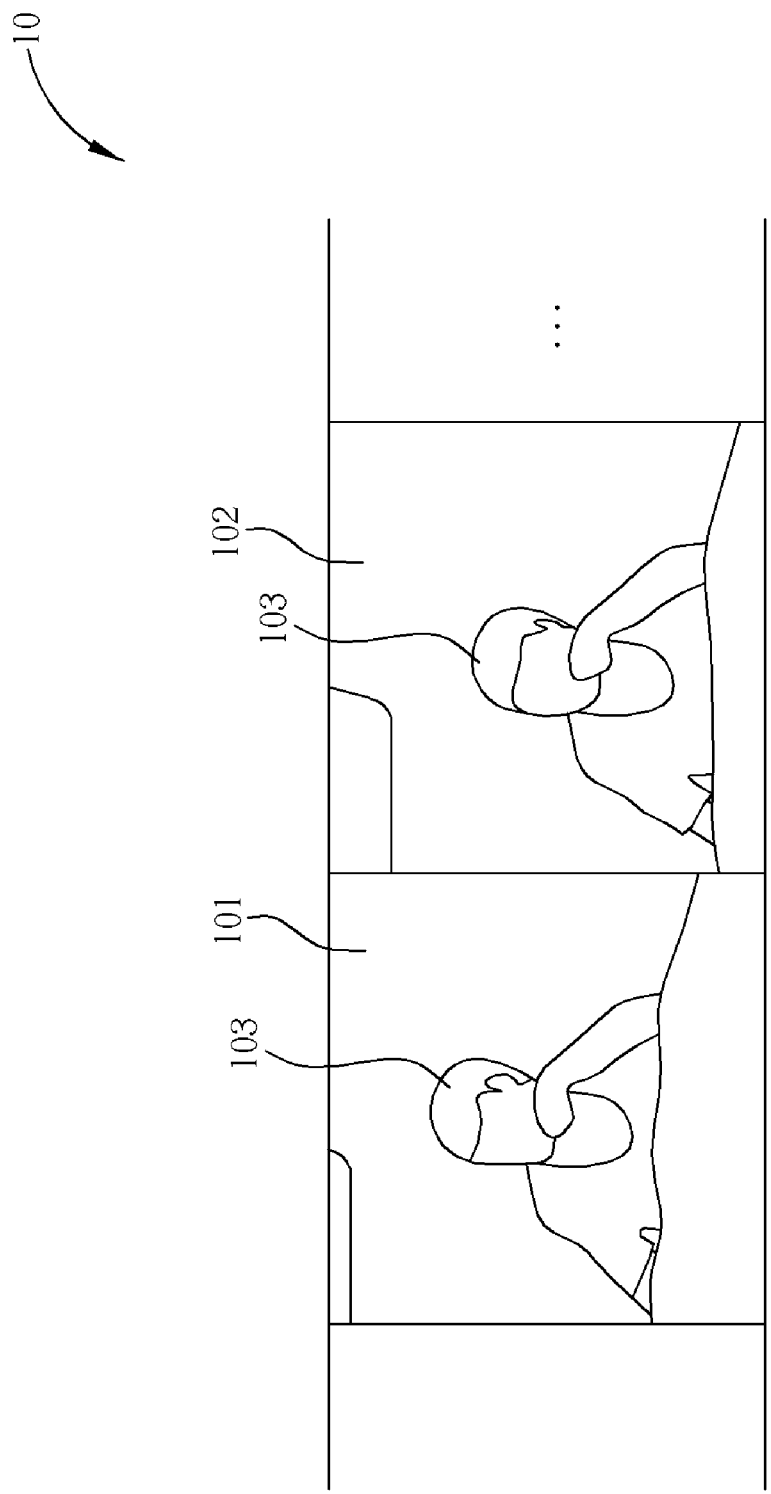
FIGS. 1 and 2 illustrate an example of performing image stabilization according to the prior art.
Figure 2:
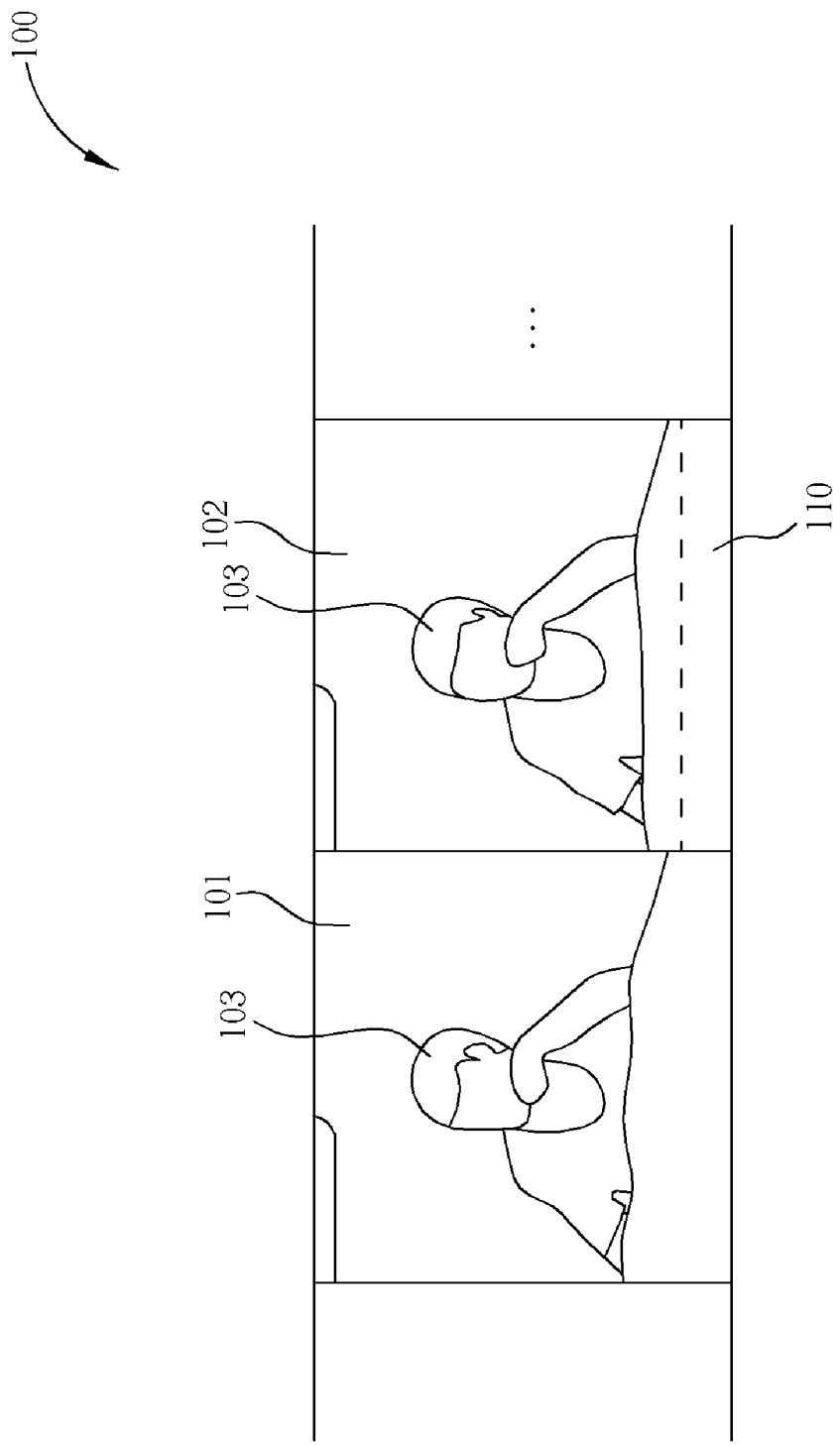
Figure 3:
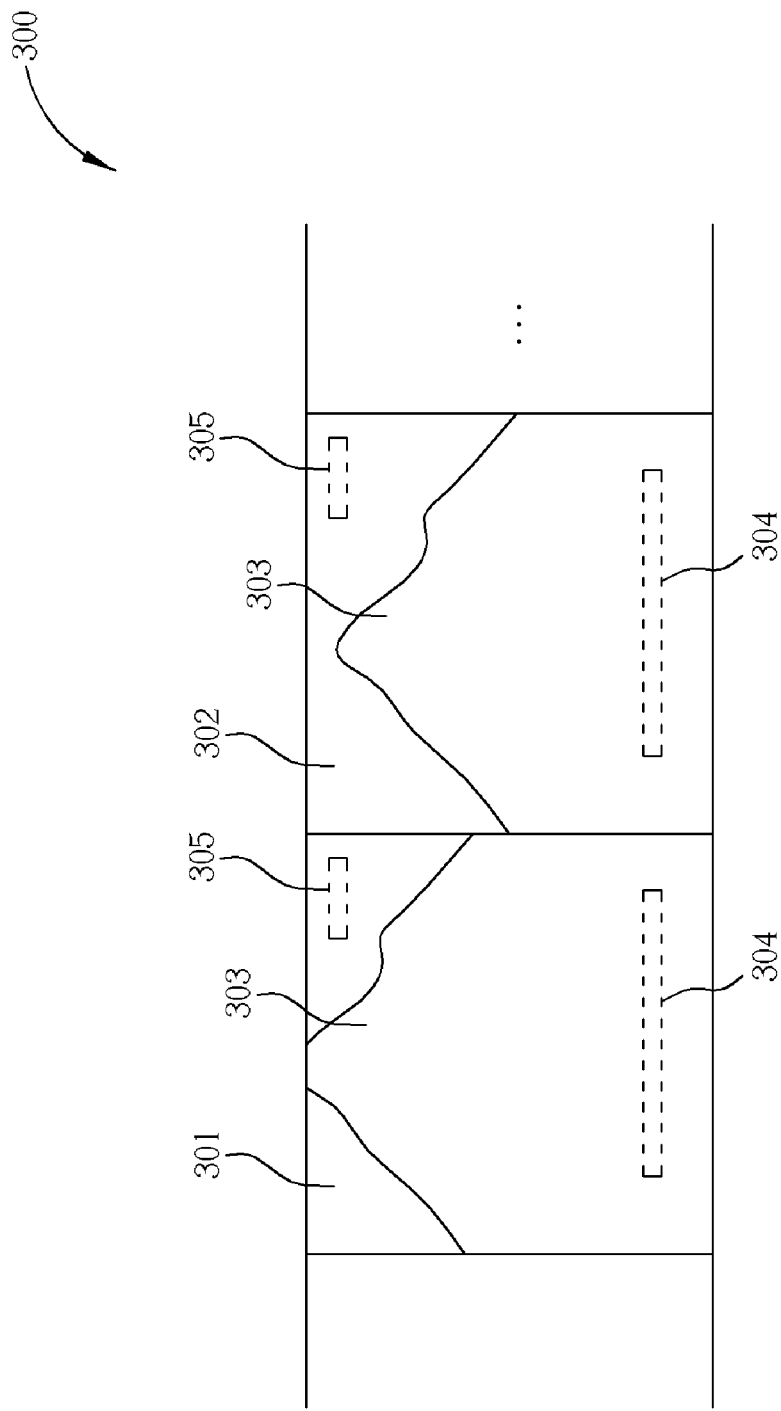
FIGS. 3 and 4 illustrate image stabilization with subtitles according to the prior art.
Figure 4:
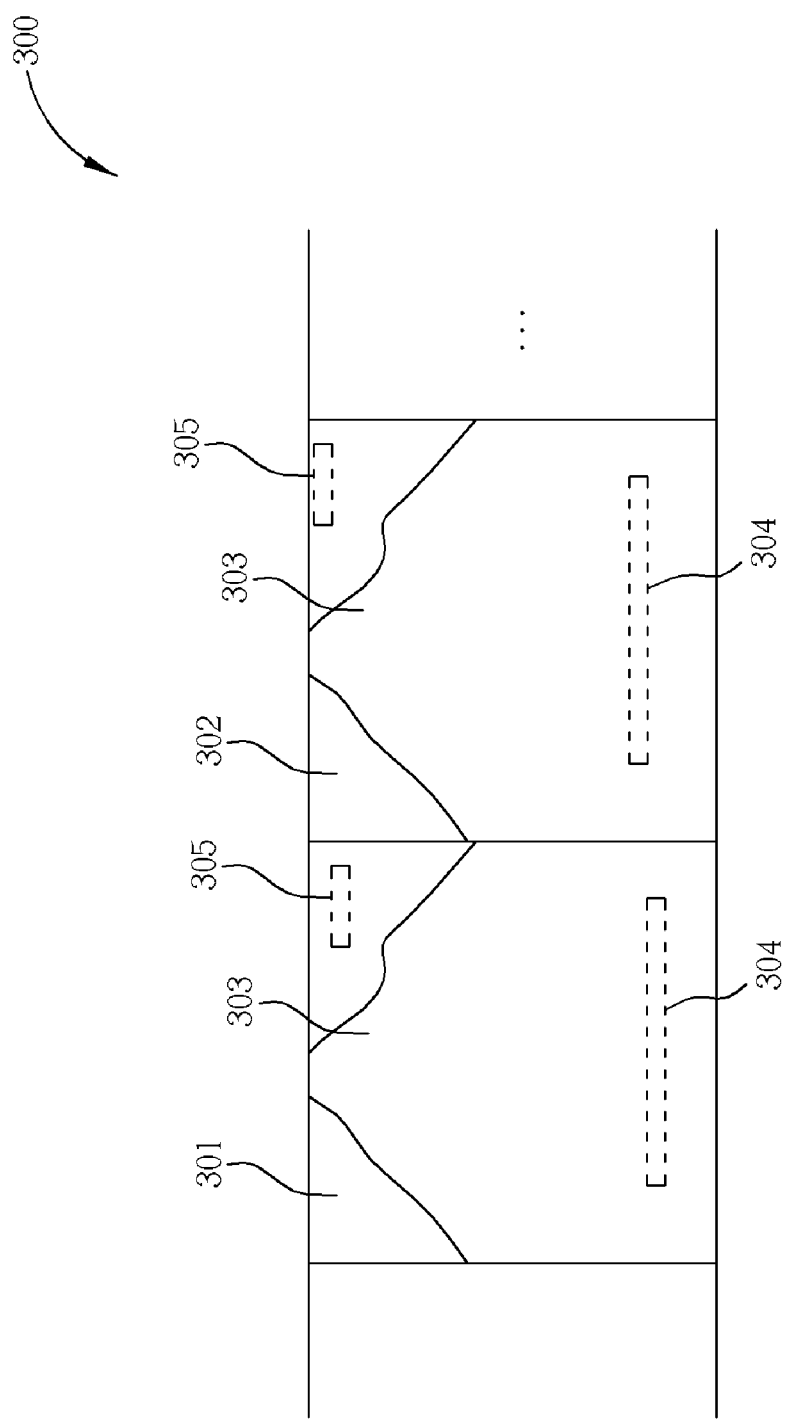
Figure 5:
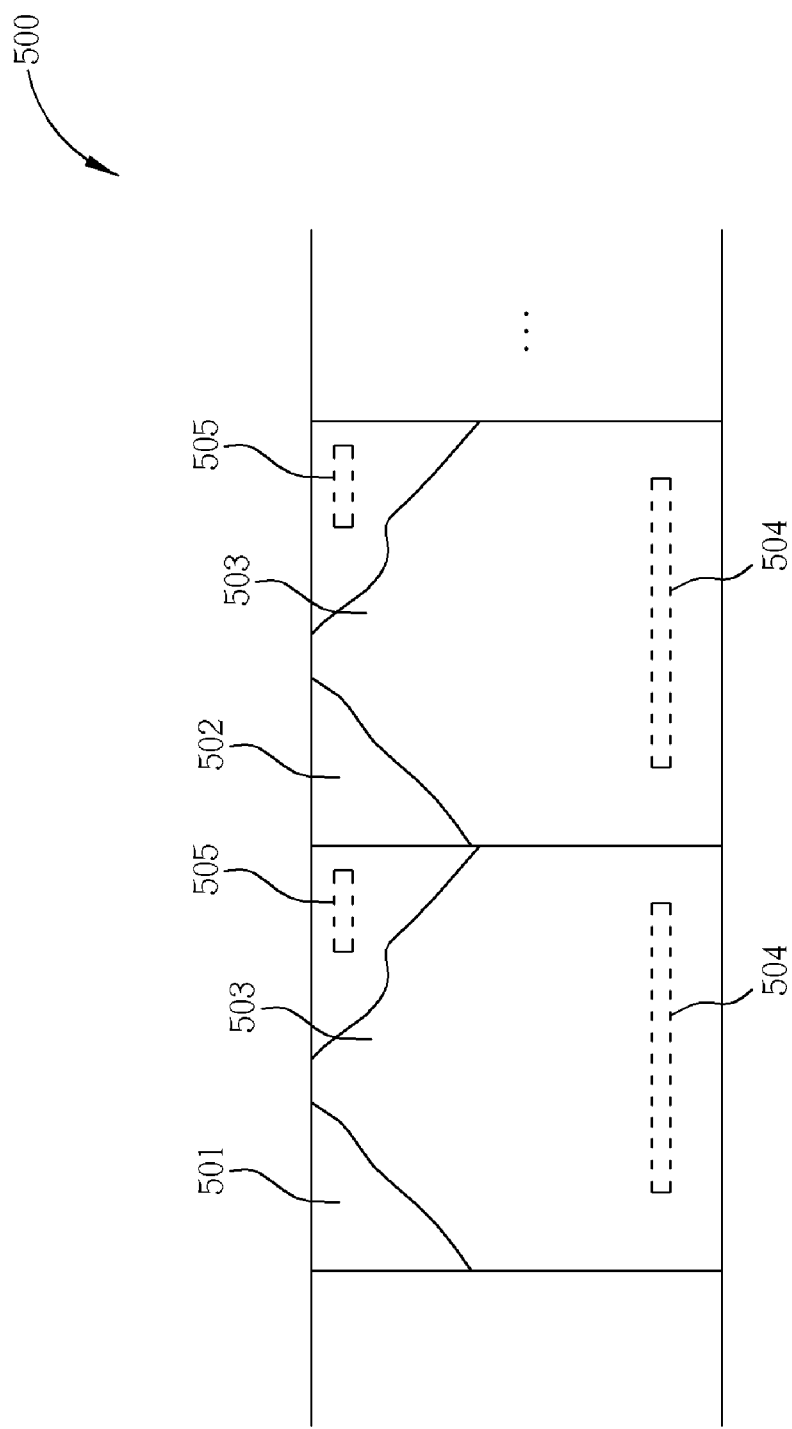
FIG. 5 illustrates image stabilization according to the present invention.
Figure 6:
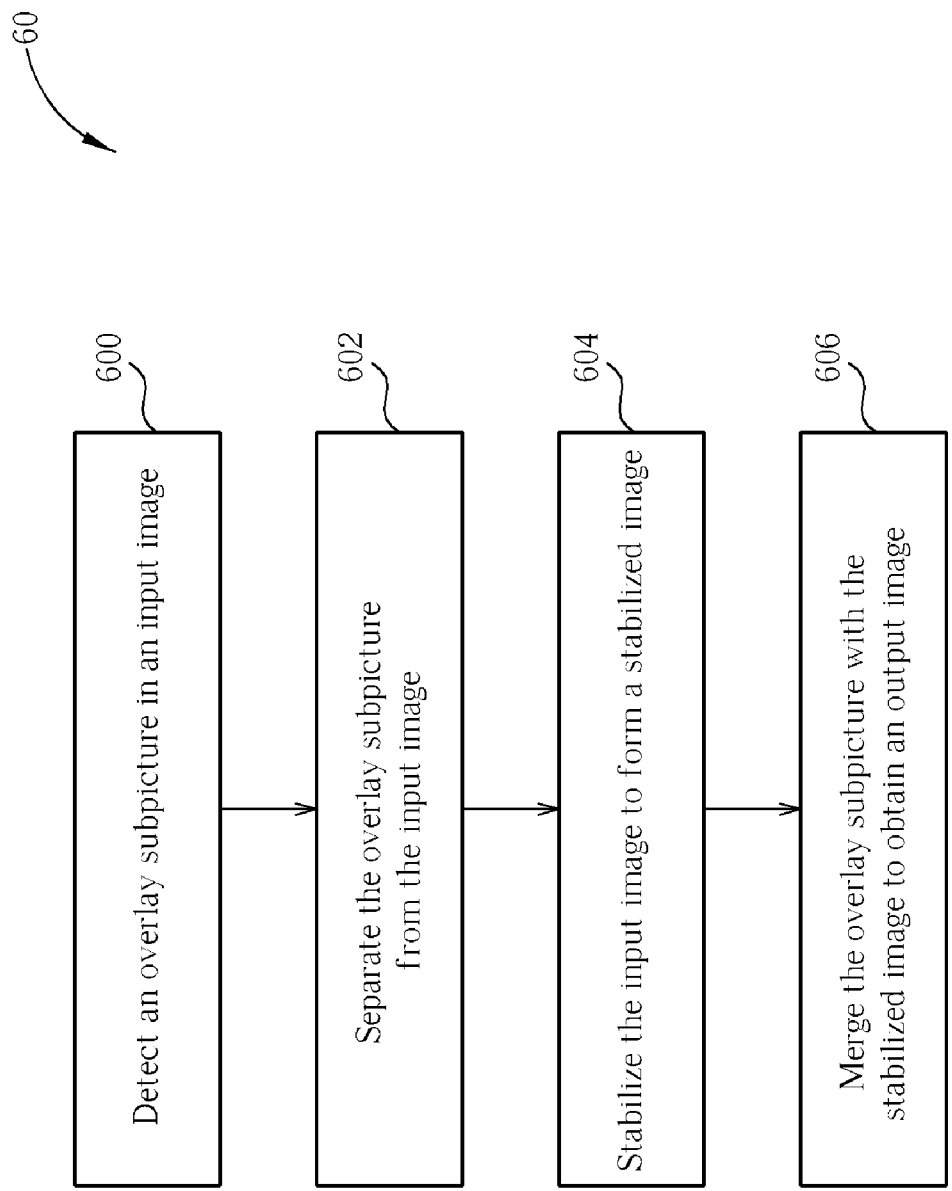
FIG. 6 is a flowchart of a process for performing image stabilization according to the present invention.

Please refer to FIGS. 5 and 6. FIG. 5 illustrates handling overlay subpictures during image stabilization according to the present invention. FIG. 6 is a flowchart of a process 60 for performing image stabilization according to the present invention. Briefly, taking a video clip 500 as an example, the video clip 500 may be considered a stabilized version of the video clip 300 shown in FIG. 3. The present invention begins in Step 600 with detecting an overlay subpicture in an input image 302. The subpicture may be a part of the image with some specific characteristics. For example, the subpicture may be graphic bitmap overlays used in video to create subtitles, captions, karaoke lyrics, menu highlighting effects, and so on. The overlay subpicture may be subtitles 504, the timer 505, a logo, another static object of the input image 502, or some combination of the above. Once the overlay subpicture(s) are identified, the overlay subpicture(s) may be separated from the input image 302 in Step 602. The input image 302 may then be stabilized to form a stabilized image 502 in Step 604, and the overlay subpicture(s) 504, 505 may then be merged with the stabilized image 502 to obtain an output image in Step 606.

The method may further comprise utilizing the input image 302 and a plurality of images, e.g. other images in the video clip 500, to determine a static region 504 of the input image 302 corresponding to the overlay subpicture. Most images in the video clip 500 may comprise subtitles, a logo, or other overlay subpictures. Taking the subtitles, which may represent text of spoken audio in the video clip 500, as an example, the subtitles may be limited to the static region of the input image and the plurality of images. So, prior to detecting the subtitles, the static region corresponding to the subtitles may be determined first from analyzing the input image 302 and the plurality of images. Then, the subtitles may be detected in the static region in the input image 302. Likewise, the timer may be located in a timer region 505. So, prior to detecting the subtitles, the timer region 505 may be determined from the input image 302 and the plurality of images. Then, the timer may be detected in the timer region in the input image 302.

To determine the static region 504, 505 of the input image 302, the present invention may look for regions with matching size, matching shape, and/or matching position common to the input image and the plurality of images. The matching size, matching shape, and/or matching position do not have to be exact matches, but can be determined within predetermined tolerances. For example, the subtitles may change from frame to frame, such that in some of the plurality of images, the subtitles occupy a region with short length, whereas in other of the plurality of images, the subtitles may occupy a region with long length. However, the region with long length and the region with short length may still be determined to be the static region 504, due to similar position, and similar shape of the subtitles throughout the plurality of images and the input image. Other techniques may also be utilized to determine the static region of the input image corresponding to the overlay subpicture. For example, the input image and the plurality of images may be utilized to calculate a motion vector, a luminance variation, and/or a chrominance variation matching a predetermined criterion. In the example of the logo, the logo may have similar luminance and chrominance throughout the plurality of images and the input image. For example, the logo may be blue, red, white, or any other color, and the color of the logo may change very little throughout the video clip 500. Not to mention, the logo may have very little variation of position throughout the video clip 500, for example being located in a corner of each image of the plurality of images and the input image. Therefore, low motion, low luminance variation, and low chrominance variation throughout the video clip 500 may indicate presence of the static region 504, 505, and may be utilized to determine the static region of the input image 302 corresponding to the overlay subpicture.

The overlay subpicture may be separated (Step 602) by determining boundaries of the overlay subpicture, recording a location of the overlay subpicture, generating a copy of the overlay subpicture, and removing the overlay subpicture from the input image. Then, the overlay subpicture may be merged by laying the copy over the stabilized image at the location. For example, the subtitles may have a color of white or yellow. Thus, to determine the boundaries of the subtitles, the color of the subtitles may be utilized in contrast with colors of surrounding pixels to determine which pixels belong to the subtitles. Then, the location of the subtitles may be recorded. The location could be a corner of the subtitles, a center of the subtitles, or another point of the subtitles. The location may be an absolute location relative to dimensions of the input image. In this way, the location may be isolated from the stabilization process. In other words, even though the input image may be shifted during stabilization, and thus coordinates of the input image may be shifted, if the location is absolute relative to the dimensions of the input image, then the location will not shift with the input image during stabilization. Otherwise, an x-axis shift and a y-axis shift may be recorded during stabilization, and the location of the subtitles may be recovered from the x-axis shift and the y-axis shift post stabilization. The copy may be made according to the boundaries of the subtitles. Then, the subtitles may be removed from the input image. Of course, removal of the subtitles implies replacement of the pixels of the subtitles with something, which something may preferably be image data from similar locations in frames immediately preceding or following the input image, or less preferably may be interpolated image data from the surrounding pixels surrounding the subtitles. The pixels of the subtitles may be considered the region the subtitles are located in within the input image.

The overlay subpicture may be merged with the stabilized image to obtain the output image, and this may be accomplished by processing a region the overlay subpicture is located in, and setting the overlay subpicture separated from the input image on the stabilized image. The region the overlay subpicture is located in may be processed by replacing the region the overlay subpicture is located in with image data from a second region of the stabilized image, or by replacing the region the overlay subpicture is located in with image data from a second region of at least one image of the plurality of images. Then, the overlay subpicture may replace pixels of the stabilized image located where the overlay subpicture was located relative to the dimensions of the input image. The overlay subpicture may be merged with the stabilized image to obtain the output image by further smoothing a border region of the overlay subpicture and the stabilized image by a low-pass filter, such as performing a Gaussian smoothing. The overlay subpicture may comprise subtitles, a logo, and/or a timer, though other types of overlay subpicture may also be processed by the present invention.

In another embodiment, the overlay subpicture may be merged by masking the input image except the overlay subpicture and laying the stabilized image over the masked input image. After the overlap subpicture is identified, the step of masking the input image is to keep only the overlay subpicture of the input image visible. The stabilized image is generated from the input image and laying the stabilized image over the masked input image. The overlay subpicture of the stabilized image may be removed before merging it with the masked input image.

In the prior art, the subtitles, logo, timer, or other overlay subpicture shifted with the input image as the input image was stabilized to form the stabilized image. In the present invention, however, the overlay subpicture(s) are identified, separated from the input image or replaced in the stabilized image, the input image is stabilized to form the stabilized image, and the overlay subpicture(s) are then returned or merged to the stabilized image in their original location relative to the dimensions of the frame. In this way, over the video clip as a whole, and from frame to frame, the overlay subpicture(s) remain stable, in spite of the rest of the image shifting due to image stabilization. This creates a more pleasing viewing experience for the user, and makes the image stabilization process more flexible for integration even after the overlay subpicture(s) have been added to the video clip.

Those skilled in the art will readily observe that numerous modifications and alterations of the device and method may be made while retaining the teachings of the invention.

What is claimed is:

1. A method of handling overlay subpictures in stabilized images comprising:
   detecting an overlay subpicture in an input image;
   stabilizing the input image to form a stabilized image; and
   merging the overlay subpicture with the stabilized image to obtain an output image by: processing a region the overlay subpicture is located in, and setting the overlay subpicture separated from the input image on the stabilized image;

wherein processing the region the overlay subpicture is located in comprises replacing the region the overlay subpicture is located in with image data from a second region of the stabilized image.

2. A method of handling overlay subpictures in stabilized images comprising:

detecting an overlay subpicture in an input image;

stabilizing the input image to form a stabilized image; and merging the overlay subpicture with the stabilized image to obtain an output image by: processing a region the overlay subpicture is located in, and setting the overlay subpicture separated from the input image on the stabilized image;

wherein processing the region the overlay subpicture is located in comprises replacing the region the overlay subpicture is located in with image data from a second region of at least one image of a plurality of images.

3. A method of handling overlay subpictures in stabilized images comprising:

detecting an overlay subpicture in an input image;

stabilizing the input image to form a stabilized image; and merging the overlay subpicture with the stabilized image to obtain an output image by: processing a region the overlay subpicture is located in, setting the overlay subpicture separated from the input image on the stabilized image, and smoothing a border region of the overlay subpicture and the stabilized image.

4. A method of handling overlay subpictures in stabilized images comprising:

detecting an overlay subpicture in an input image;

separating the overlay subpicture from the input image;

stabilizing the input image to form a stabilized image; and merging the overlay subpicture with the stabilized image to obtain an output image;

wherein separating the overlay subpicture comprises:

recording a location of the overlay subpicture;

generating a copy of the overlay subpicture; and removing the overlay subpicture from the input image.

5. The method of claim 4, wherein merging the overlay subpicture comprises:

laying the copy over the stabilized image at the location.

* * * * *